(12) United States Patent
Zwol et al.

(10) Patent No.: US 8,005,862 B2
(45) Date of Patent: Aug. 23, 2011

(54) CLASSIFYING CONTENT RESOURCES USING STRUCTURED PATTERNS

(75) Inventors: Roelof van Zwol, Badalona (ES); Börkur Sigurbjörnsson, Badalona (ES); Simon Ernest Overell, Fulham (GB)

(73) Assignee: Yahoo! Inc., Sunnyvale, CA (US)

( * ) Notice: Subject to any disclaimer, the term of this patent is extended or adjusted under 35 U.S.C. 154(b) by 402 days.

(21) Appl. No.: 12/052,679

(22) Filed: Mar. 20, 2008

(65) Prior Publication Data

US 2009/0240729 A1 Sep. 24, 2009

(51) Int. Cl. *G06F 17/30* (2006.01)

(52) U.S. Cl. .......................... 707/791; 707/797

(58) Field of Classification Search .............. 707/791, 707/797

See application file for complete search history.

(56) References Cited

U.S. PATENT DOCUMENTS

| | | | |
|---|---|---|---|
| 6,101,515 A * | 8/2000 | Wical et al. ............... 715/234 |
| 6,678,692 B1 * | 1/2004 | Hyatt ....................... 707/758 |
| 6,741,998 B2 * | 5/2004 | Ruth et al. ................ 707/797 |
| 6,853,998 B2 * | 2/2005 | Biebesheimer et al. ... 707/765 |
| 7,627,588 B1 * | 12/2009 | Mohan et al. .............. 1/1 |
| 7,668,885 B2 * | 2/2010 | Wittke et al. ............. 707/705 |
| 2004/0015586 A1 * | 1/2004 | Hegli et al. ............... 709/225 |
| 2005/0210008 A1 * | 9/2005 | Tran et al. ................. 707/3 |
| 2007/0208719 A1 * | 9/2007 | Tran ......................... 707/3 |
| 2008/0270385 A1 * | 10/2008 | Manet et al. .............. 707/5 |
| 2008/0313107 A1 * | 12/2008 | Futatsugi ................. 706/11 |
| 2009/0157571 A1 * | 6/2009 | Smith et al. .............. 706/12 |
| 2009/0252413 A1 * | 10/2009 | Hua et al. ................. 382/170 |
| 2009/0274434 A1 * | 11/2009 | Mei et al. ................. 386/52 |
| 2010/0169393 A1 * | 7/2010 | Fruchter et al. .......... 707/828 |
| 2011/0071933 A1 * | 3/2011 | Daly et al. ................. 705/35 |

OTHER PUBLICATIONS

R. Bunescu et al. "Using Encyclopedia Knowledge for Named Entity Disambiguation", *Proceedings of EACL*, pp. 9-16, 2006.
D. Buscaldi et al., "Inferring Ontologies from Multiple Resources for Geographic Information Retrieval", *Proceedings of the SIGIR Workshop on GIR*, pp. 53-55, 2006.
S. Cucerzan, "Large-scale named Entity Disambiguation Based on Wikipedia Data", *Proceedings of EMNLP-CoNLL*, 2006.
DBpedia, http://dbpedia.org/About, Jan. 9, 2009, 2 pages.
T. Joachims, Cornell University, http://svmlight.joachims.org/, Version 6.02, Aug. 14, 2008, Jan. 9, 2009, 3 pages.
T. Joachims, "Making Large-Scale SVM Learning Practical", *Advances in Kernal Methods*, Support Vector Learning, pp. 41-59, 1998.
D. Kinzler, "WikiSense: Mining the Wiki", *Proceedings of WikiMania*, 2005.
S. Overell et al., "Geographic Co-occurrence as a tool for GIR", *Proceedings of the CIKM Workshop on GIR*, 2007.
S. Overell et al., "Classifying Tags Using Open Content Resources", WSDM, 2009.
M. Ruiz-Casado et al., "Automatic Assignment of Wikipedia Encyclopedia Entries to WordNet Synsets", *Proceedings of AWIC*, pp. 380-386, 2005.
F. Suchanek et al., "YAGO: A Core of Semantic Knowledge Unifying WordNet and Wikipedia", *Proceedings of WWW*, pp. 697-706, 2007.

* cited by examiner

*Primary Examiner* — Don Wong
*Assistant Examiner* — Kim T Nguyen
(74) *Attorney, Agent, or Firm* — Weaver Austin Villeneuve and Sampson LLP

(57) ABSTRACT

Methods and apparatus are described for classifying content resources in a data set according to an external classification scheme using structural patterns associated with the data set.

21 Claims, 9 Drawing Sheets

| Feature | tf | tf-idf | tf-il |
|---|---|---|---|
| c:Buildings and Structures in Manhattan | 1 | 0.51 | 1 |
| c:Skyscrapers in New York City | 1 | 0.53 | 1 |
| t:InfoBox Skyscraper | 1 | 0.49 | 1 |
| c:*Manhattan* | 1 | 0.48 | 0.5 |
| c:*Buildings and structures in New York City* | 2 | 1.16 | 1 |
| c:*Skyscrapers in the USA* | 1 | 0.59 | 0.5 |
| c:*Skyscrapers by city* | 1 | 0.59 | 0.5 |
| c:*Landmarks in New York* | 1 | 0.60 | 0.5 |

Table 1: Weighting Functions example

FIG. 3

| Variable | Value | Prec | $F_1$ |
|---|---|---|---|
| Cat. Arcs | 0 | 0% | 0 |
| | 1 | 87.1% | 0.694 |
| | 2 | 87.3% | 0.694 |
| | 3 | 87.0% | 0.696 |
| | 4 | 0% | 0 |
| | 5 | 0% | 0 |
| Temp. Arcs | 0 | 86.7% | 0.695 |
| | 1 | 86.8% | 0.693 |
| | 2 | 86.9% | 0.696 |
| | 3 | 87.0% | 0.696 |
| | 4 | 87.0% | 0.696 |
| | 5 | 86.9% | 0.692 |
| Weight. Func. | tf | 86.7% | 0.623 |
| | tf.idf | 87.6% | 0.668 |
| | tf-il | 87.0% | 0.696 |

Table 2: Varying Feature Values

*FIG. 4*

Threshold – $F_1$-Measure

: Threshold – Prop. of articles Classified

|        | Opt. for Recall | DBpedia | Opt. for Prec. |
|--------|-----------------|---------|----------------|
| Prec.  | 72%             | 58%     | 86%            |
| Recall | 81%             | 17%     | 38%            |
| Acc.   | 62%             | 16%     | 36%            |

Table 3: System evaluation results

*FIG. 7*

Per Category Precision

CLASSIFYING CONTENT RESOURCES USING STRUCTURED PATTERNS

BACKGROUND OF THE INVENTION

The present invention relates to the classification of content resources, e.g., web pages or other documents, and, more specifically, to techniques which employ structured patterns embedded in or associated with the content resources to facilitate classification.

Current approaches in the area of content classification focus on content analysis, using natural language approaches, and/or the analysis of meta-data (data about data) in which the content associated with documents is used for the classification. The first type of approach requires a semantic analysis of the content which, because of the processing resources required for such analysis, and/or the typical size of the corpus, means that such approaches are not scalable, and are thus not suitable for the large volumes of information in contexts such as the World Wide Web. The second type of approach is prone to data sparsity. Due to the minimal amounts of meta-data and the sparseness of meta-data associated with many large corpora, it is generally only possible to classify small portions of a corpus with meta-data alone.

SUMMARY OF THE INVENTION

According to the present invention, structured patterns by which content resources may be characterized are employed to facilitate classification of the content resources. According to one class of embodiments, method and apparatus are provided for classifying a set of content resources. The set of content resources is characterized by structured patterns among features associated with the content resources. A set of features associated with each of selected ones of the content resources is enriched with reference to the structured patterns. Each of the content resources is classified with reference to the associated features and a predefined classification schema not associated with the set of content resources. Classification of the content resources does not require semantic analysis of text associated with the content resources.

According to one class of embodiments, the structured patterns form a hierarchy of features, and enriching the set of features associated with each of the selected content resources involves traversing one or more levels of the hierarchy for each of the selected content resources to identify at least one additional feature for inclusion in the set of features. According to some of these embodiments, the number of the levels of the hierarchy which may be traversed to effect enriching of the set of features associated with each of the selected content resources is tunable.

According to another class of embodiments, the classification of each of the content resources involves representing each of the content resources as a multi-dimensional vector comprising scalar values representing the associated set of features. Selected ones of the scalar values are determined with reference to a weighting function. According to some of these embodiments, the weighting function may be one or more of (1) a first number representing instances of a corresponding feature for the content resource, (2) the first number combined with a second number representing instances of the corresponding feature in the set of content resources, or (3) the first number combined with a third number representing paths in a hierarchy of the structured patterns between the corresponding feature and the content resource.

According to yet another class of embodiments, the classification of each of the content resources involves generating an output value for each of a plurality of classes for each content resource. The output value associated with each class represents a confidence level that the corresponding content resource belongs to the associated class. A threshold value is set for comparison with the output values. Output values above the threshold value are designated as positively classified and output values below the threshold value are designated as unclassified. According to some of these embodiments, the threshold value is tunable to strike a balance between precision and recall.

A further understanding of the nature and advantages of the present invention may be realized by reference to the remaining portions of the specification and the drawings.

BRIEF DESCRIPTION OF THE DRAWINGS

FIG. 3 is a table illustrating examples of weighting function values for the content resource of FIG. 2.

FIG. 4-8 are tables and graphs illustrating performance of various implementations of the present invention.

DETAILED DESCRIPTION OF SPECIFIC EMBODIMENTS

Figure 1:
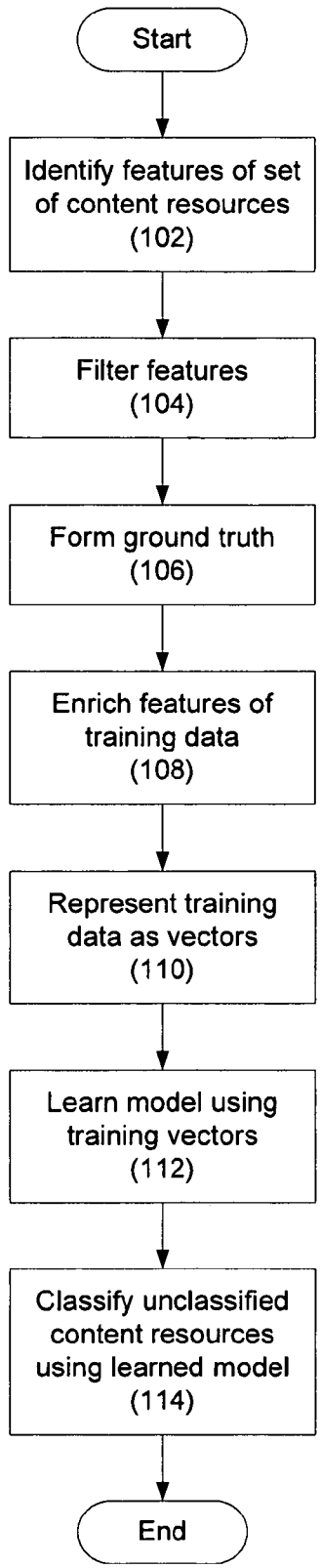
FIG. 1 is a flowchart illustrating operation of a particular class of embodiments of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The present invention provides methods and apparatus for classifying content resources in a data set (e.g., Wikipedia, DMOZ, Yahoo! Directory, etc.) according to an external classification scheme using structural patterns associated with the data set. According to various embodiments, the structural patterns of content resources are considered as features that form a multi-dimensional space with each resource being represented as a vector in the space. The sparsity of the space is reduced with reference to these structural patterns, and the space is partitioned and the resources categorized with reference to a model developed with reference to the structural patterns in the data set and the external classification scheme. In general, embodiments of the invention employ two basic components, i.e., a collection of content resources that preferably has a coherent structured nature. And an external classification scheme with sufficient training data to be used as the ground truth for learning the method.

A specific embodiment of the invention will now be described with reference to an example implementation in which the collection of content resources being classified corresponds to a snapshot of the corpus of Wikipedia articles. WordNet categories are used for the external classification scheme and ground truth. Two structural patterns found in Wikipedia are used for training and classification: categories and templates. Some background information on these is provided below.

Wikipedia is the largest reference Web-site on the Internet. The content is collaboratively written by volunteers. To date there are over 2 million full articles in the English language version and 8.2 million full articles across all languages (www.wikipedia.org).

Each Wikipedia article has a unique title and is assigned to at least one category. Categories form a directed graph and can be navigated in a hierarchy. Articles can optionally contain any number of templates. Templates contain structured data and article formatting information. Wikipedia templates can transclude other templates forming a similar network to categories. Templates are identified as providing important information regarding an article's topic, while categories are identified as providing information representing sub-topic relations. In the example implementation described below, the WikiXML download of the English Language Wikipedia provided at http://ilps.science.uva.nl/WikiXML/ was employed. This was generated from the 4 Nov. 2006 Wikipedia dump and contains 1.5 million articles and a total of 3.8 million pages including redirects, categories and templates.

WordNet is a publicly available English lexicon. Words (also referred to as lemmas) are mapped to multiple synsets, each synset representing a distinct concept. Synsets are split into 45 syntactic categories. Syntactic categories are classified further by part-of-speech into adjective, adverb, verb, and noun classes. In the described implementation, 25 noun syntactic categories from the WordNet 3.0 database are used as the external classification scheme.

Because of desire for scalability as well as making this implementation applicable in other contexts, a full semantic interpretation of Wikipedia was avoided. Instead, Wikipedia article meta-data (specifically the structural patterns of categories and templates) are employed with a supervised classifier. A Support Vector Machine (SVM) is used as the classifier; in particular, the SVMlight package for learning and classification described in *Making Large-Scale SVM Learning Practical*, T. Joachims, Advances in Kernal Methods & Support Vector Learning, pp. 41-59, 1998, the entirety of which is incorporated herein by reference for all purposes. As will be described, a binary SVM classifier is trained for each class. Each article is classified by each classifier and assigned to the class of the classifier outputting the highest decision value.

Operation of a particular embodiment of the invention will now be described with reference to the flowchart of FIG. 1. A set of "features" are identified (102) which, in this example, are the most common categories and templates associated with the Wikipedia database. The categories and templates are then filtered to eliminate undesirable or irrelevant features (104), e.g., categories and templates which relate to administration and formatting rather than substantive content.

As used herein, the term "feature" refers to any structured piece of information within or associated with a content resource, and by which the content resources in a data set to be classified may be characterized. And it will be understood that the present invention is not limited to any particular set of features for any particular data set. Rather, any structured element that exists in a content resource or by which a content resource may be characterized may be employed.

We then form a "ground truth," i.e., a portion of the data set for which the classifications are already known, for the purpose of training the classification algorithm (106). According to a particular class of embodiments, this may be achieved by mapping the content resources in the data set to a known lexicon. In this example, Wikipedia articles are mapped (e.g., by title or redirect) to WordNet lemmas and their associated classifications. For example, the lemma "Manhattan" is classified in WordNet as a "location." Therefore, a Wikipedia article titled "Manhattan" would be associated with the classification "location" and included in the training data set. By contrast, an article titled Chrysler Building would not be included in the training data set as WordNet does not include a matching lemma. That is, it would instead be included in the data set of content resources to be classified.

When multiple senses exist for a word, the class of the highest ranked sense is taken. For example the WordNet lemma Manhattan is classified as a location in WordNet and is matched to the corresponding Wikipedia article titled Manhattan. The ground truth is formed for all the Wikipedia articles where the titles or redirects match WordNet nouns. For each WordNet syntactic category the ground truth is partitioned into a training set and a test set. In this particular example, the test set included 100 articles from each category (or 10% of the articles from a category where less than 1000 examples exist). The final ground truth included 63,664 Wikipedia articles matched to WordNet lemmas, 932 of which were partitioned as the test set.

Figure 2:
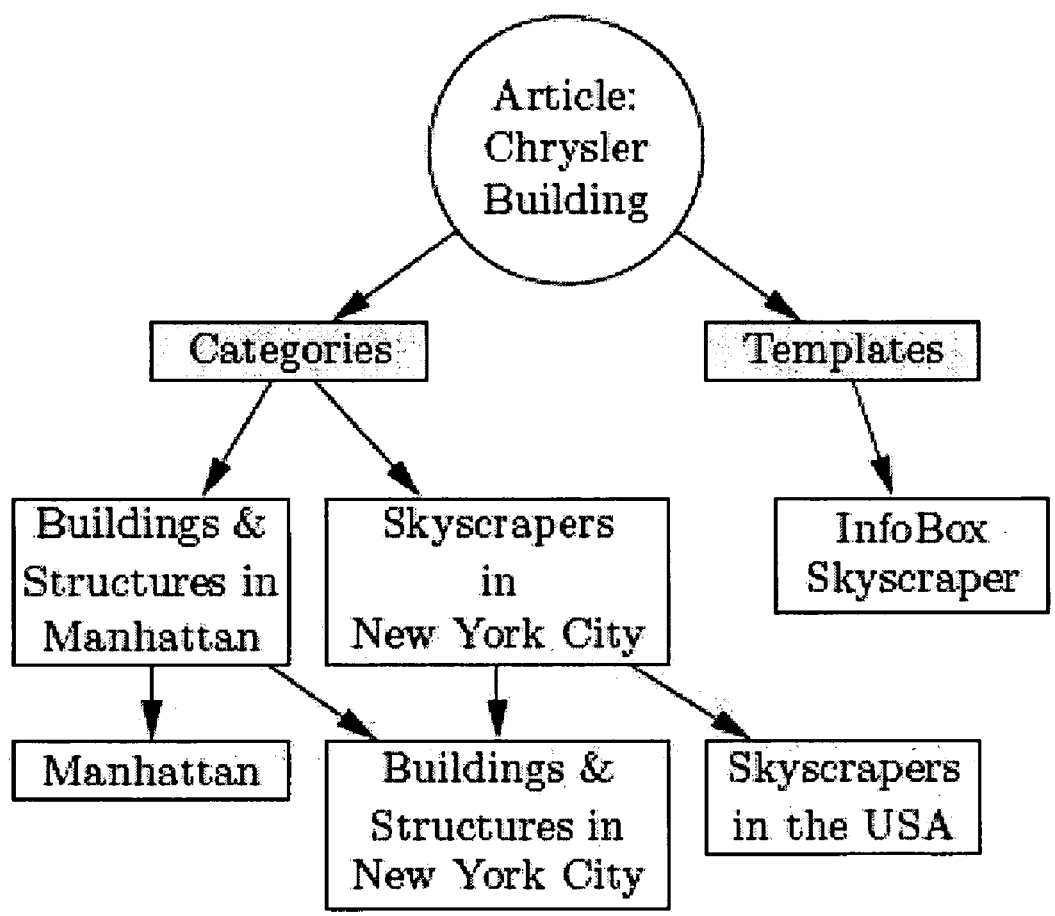
FIG. 2 is a diagram illustrating a hierarchical representation of a particular type of content resource.

In some implementations, problems may arise relating to data sparsity. For example, in this implementation, WordNet categories may be under represented in the ground truth. In addition some articles have very few features. Therefore, according to some embodiments, the features of the content resources in the training data set are enriched with reference to relationships among features (108), in this example, the hierarchical interrelations among the categories and templates associated with the Wikipedia data set. That is, the sparsity of data in the training set is reduced by adding information derived from relationships among the relevant features of the data set, e.g., the categories and templates "higher up" in the hierarchy of the Wikipedia data set. This may be understood with reference to the example hierarchy illustrated in FIG. 2.

The content resource shown is a Wikipedia article about the Chrysler Building which has two categories ("Buildings & Structures in Manhattan" and "Skyscrapers in New York City") and one template ("InfoBox Skyscraper") immediately associated with it. If the hierarchy is traversed another level, there are additional categories encompassing each of the categories on the first level, one of which ("Buildings & Structures in New York City") encompasses both. These additional features may be associated with the base content resource, i.e., the article, to make the data for that resource less sparse.

As will be understood, the number and types of features associated with a particular resource and a particular data set, and the manner in which they interrelate will vary considerably. In addition, the number of features added to content resources to deal with the sparse data issue may vary without departing from the scope of the invention. For instance, in the case of a Wikipedia article, there might be additional features on additional levels of the hierarchy. However, at some point, the addition of more features merely adds noise to the data set. The appropriate number of levels of the hierarchy to traverse and the appropriate number of features to add may therefore be determined empirically and tuned to suit the particular application.

In the example implementation, there are 25 noun syntactic categories in WordNet (not including the top-level noun category). Of these only 10 are represented with enough articles in Wikipedia matched to WordNet words to train an SVM that will not significantly over fit. These include: Act, Animal, Artifact, Food, Group, Location, Object, Person, Plant and Substance. The Time category may also be included by artificially adding days and years categorized as times. In this example, the 366 days of the year (in numerical day, full month format), and 121 years (in numerical format from 1887 through 2007 inclusive) were added.

There are a total of 39,516 templates and 167,583 categories in the dump of Wikipedia used in this example. The majority of these categories or templates occur in less than 10 articles. Therefore, the categories and templates that occur in more than 50 articles were selected to form the features list, resulting in the 25,000 most commonly occurring categories and templates. This is a small enough number of features to allow relatively fast learning and classification for a SVM.

Most articles in Wikipedia have very few categories and templates (in fact the majority of articles have no templates and only one category). Because of this sparsity of features, and as mentioned above, it was desirable to increase the number of categories and templates each article contains. In this example, this was achieved using the category network and template transclusion. That is, Wikipedia categories and templates are linked in a directed network. Therefore, backwards navigation through the network may be done to increase the number of categories and templates associated with each article.

And as mentioned above, a significant proportion of Wikipedia categories are actually related to Wikipedia administration rather than article content. These categories were identified by navigating every possible path through the category tree back to the root Category node for each article. If every path for a category passes through the Wikipedia Administration category, that category is added to a black list of categories not considered as features. 12,271 categories were found through this method.

Similarly there exist templates that contain only page formatting information and contribute nothing to article content. In this example, these templates were identified by pruning all templates that occur in over 30,000 articles. Eleven templates were identified with this method.

Each content resource in the training data set is then represented as a vector in which each of the associated features (represented as scalar values) is a dimension (110). The value for each feature is determined using a weighting function. In the example implementation described herein, these values were determined as follows.

As described above, the ground truth comprises WordNet nouns matched to Wikipedia articles, and the features for classification are 25,000 categories and templates. According to a more specific implementation, this ground truth was partitioned into training and test sets to enable the selection of the optimum values for variables governing the feature weights. The variables optimized were: the number of arcs to traverse in the category network; the number of arcs to traverse in the template network; and the choice of weighting function.

Between 0 and 5 arcs were evaluated for both categories and templates. Taking category arcs as an example, 0 category arcs means the article's categories are ignored, 1 category arc means the article's categories are included as features, 2 category arcs means the article's categories and the categories of those categories are included as features, and so on. By traversing more arcs, the number of features a document contains is increased. The scalar value for each feature is determined by a weighting function. In this example, the same weighting function was used for both category and template features.

Three weighting functions were considered: Term Frequency (tf)—the scalar value of each feature is the number of times it occurs for this article, i.e., the number of unique paths through the hierarchy from the article to the feature; Term Frequency/Inverse Document Frequency (tf.idf)—the scalar value of each feature is the number of times it occurs for this article divided by the log of the number of times it occurs in the document collection; and Term Frequency/Inverse Layer (tf-il)—the scalar value of each feature is the number of times it occurs for this article divided by the number of arcs (or hierarchy layers) that had to be traversed in the category or template network to reach it.

Referring back to the Chrysler Building article example, Table 1 in FIG. 3 shows how the scalar values of the features vary with the choice of weighting function. For the category "Building & Structures in New York City," the Term Frequency (tf) is 2 in that there are two unique paths in the category network from the article to this feature. On the other hand, the Term Frequency/Inverse Layer (tf-il) value for this feature is 1 in that it is two layers away from the article in the hierarchy. The c or t prefix specifies whether a feature is a category or a template. The features added by traversing an additional category arc are shown in italics. Notice how the problem of data sparsity has been reduced, as we have added an additional 5 features to a document that originally had only 3.

According to some embodiments, one weighting function is selected and used to generate all scalar values in each content resource vector. However, the invention is not necessarily limited in this way. That is inventions are contemplated in which different weighting functions are employed for different features, e.g., "Buildings & Structures in Manhattan" could have weight tf, while "Skyscrapers in New York City" could have weight tf-il. Choosing appropriate weighting function/feature pairs may be done via empirical experiment.

After the ground truth was split into training and test sets, a search of every combination of variables was performed. The primary criterion for choosing the best method was that it must achieve a precision of more than 80% for each category. 80% was selected as an acceptable precision with large recall. Of the methods that achieved this level of precision, the one with the greatest F1 measure was selected. The optimal results were achieved traversing 3 arcs for both Categories and Templates, and using the weighting function tf-il.

Table 2 of FIG. 4 illustrates for the selected method how varying the number of arcs traversed in the Category and Template networks, and changing the weighting function affects the Precision and F1 measure. Notice that there is minimal difference in performance as Template arcs and the Weighting function vary. For Categories, when no category data are used, the data are too sparse to perform well (this is due to many articles having no templates and only one or two categories). Conversely when more than four category arcs are traversed the data become too noisy. We concluded that the features chosen are fairly robust provided the value selected for category arcs traversed produces training data that are neither too sparse nor too noisy.

SVM binary classifiers output the values of their decision functions. The output of the decision function can be interpreted as the confidence with which an article is correctly classified as a member of a category. If there exists no prior knowledge about the distribution of the data one can simply classify articles as the category of the classifier that outputs the greatest value above 0. If no classifiers output a value above 0, one can consider the article unclassified.

However if there exists prior knowledge about the data, for example if one knows a significant proportion of Wikipedia articles can be classified as one of 11 categories, the threshold could be set lower than 0. On the other hand, if one has prior knowledge that the data are particularly noisy, the threshold could be set greater than 0.

A training experiment was performed in which 250 Wikipedia articles were selected at random. Each article was classified as the WordNet syntactic category of the classifier outputting the greatest decision function. An assessor then marked each classification as correct or incorrect by hand. The threshold was then varied for the minimum acceptable output value between −1 and 1. Articles where the maximum output value from a classifier were below the threshold were considered unclassified.

Figure 5:
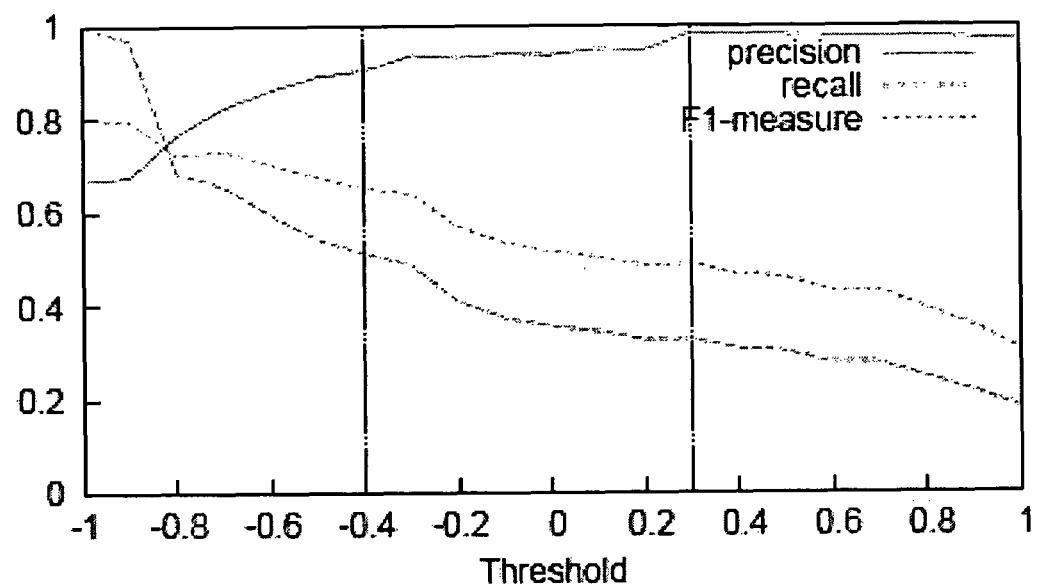

The graph of FIG. 5 shows how precision (the accuracy with which resources are classified), recall (the proportion of resources classified), and the F1 measure vary with the threshold value. The method that maximizes recall given a minimum acceptable precision was selected. A minimum acceptable precision across all categories of 90% corresponds to a recall of 51% and a threshold value of −0.4. By contrast, a minimum acceptable precision of 98% corresponds a recall of 33% and a threshold value of 0.3. A wide range of applications of embodiments of the present invention are contemplated in which the quality of classification is traded off against the quantity, from high-precision (e.g., mission-critical) applications in which there is little or no tolerance for classification mistakes, to high-recall applications in which classification mistakes may be tolerated.

Figure 6:
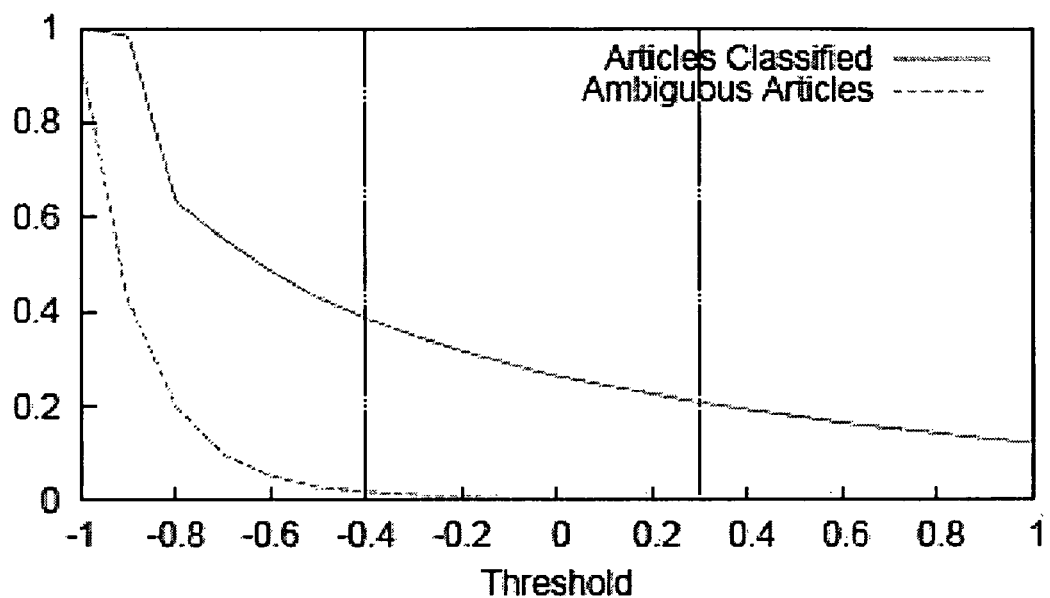

The graph of FIG. 6 shows how varying the threshold affects the proportion of articles classified and the proportion of ambiguous articles (articles with multiple positive classifications). When the threshold is −0.4, 39% of all articles are classified, 5.7% of which are ambiguous. By contrast, when the threshold is 0.3, 21% of all articles are classified, 0.5% of which are ambiguous.

Referring back to FIG. 1, once they are generated, the training vectors are processed by a machine learning algorithm to build a model for each of the possible classification classes (112), e.g., those inferred from WordNet (e.g., people, locations, group, artifact, food, etc.). The classification algorithm then applies the learned model to the data to be classified (114), i.e., the content resources in the original data set which were not included in the training data. The features for these content resources are inferred in much the same way as the features of the training data were inferred. It should be noted that any vector-space classification algorithm can be used. That is, while implementations are described herein with reference to the use of a Support Vector Machine (SVM), a wide variety of suitable alternatives exist including, for example, Naive Bayesian classifiers, linear discriminant classifiers, neural networks, and Bayesian networks.

According to various embodiments, the present invention provides an effective method for classifying content resources that outperforms competitive methods in both precision and recall. The method does not require a full semantic analysis of the content or associated meta-data, instead referring to the structured patterns that are embedded in or associated with the content resources. According to some embodiments, the method may be tunable to optimize for different tasks by varying the threshold that is set for the confidence value that is determined by the SVM classifier. And though an implementation has been described herein using WordNet syntactic categories as the classification scheme, it should be understood that this can easily be exchanged for a different scheme. The method may also be extended with additional or alternative patterns, thus enabling classification of much larger sets of content resources; theoretically the entire Web.

The performance of implementations of the present invention was compared with the performance of the mapping of Wikipedia articles to WordNet synsets provided for download from DBpedia (http://dbpedia.org/). An evaluation set of 300 Wikipedia articles was selected at random from the union of articles classified by DBpedia and articles classified by our system. We classified a total of 664,770 Wikipedia articles. DBpedia classified a total of 338,061 articles. We considered the 206,623 articles that also exist in the dump of Wikipedia taken on 4 Nov. 2006 referred to above. DBpedia's dump is from 16 Jul. 2007. We classified 258 of the articles in the evaluation set, while DBpedia classified 88 articles. There is an overlap of 38 articles.

DBpedia's classifications are optimized for precision while one implementation of our system is optimized to maximize recall given a minimum precision requirement. We also evaluated an alternative implementation of our system optimized for precision, with the threshold for the SVN decision function set to 0.3. The precision optimized system classifies a total of 344,539 articles and 125 articles in the evaluation set.

Initially, three human assessors assessed the Wikipedia articles. A randomly selected 50 articles were assessed by all assessors to measure assessor agreement. All remaining articles were only assessed by a single assessor. Assessments were performed blind. The assessors had no knowledge of which systems had classified the article or what the classifications were. The evaluation interface presented the user with the Wikipedia article that had been classified, a checkbox for each of the 25 syntactic categories, and the syntactic category brief descriptions taken from the WordNet Web-site. Assessors were told to select all syntactic categories they considered as correct classifications for each article.

We measured two values for assessor agreement: Partial Agreement and Total Agreement. Partial Agreement is where there exists a classification for an article that all assessors agree on. Total Agreement is where assessors agree on all classifications. For 86% of articles assessors had Partial Agreement. For 78% of articles assessors had Total Agreement.

Our experimental results are reported in Table 3 of FIG. 7. As we built our sample set from the pool of articles classified by both our system and DBpedia we were also able to consider articles not classified. We used standard information retrieval terminology for the measures of precision, recall, and accuracy. Precision can be considered the accuracy of the classified set.

An assessor was selected at random, and his assessments were considered ground truth for the Wikipedia articles with multiple judgments. As we considered a system classification correct if it matches any of assessor classifications, the gold standard accuracy can be considered equal to the assessor Partial Agreement, i.e., 86% (this is the point where the judgments provided by the system become as accurate as those provided by a human). As shown in Table 3, the precision optimized system reached the gold standard precision of 86% but at a significant recall trade off, classifying less than half as many articles as the recall optimized system.

Figure 8:
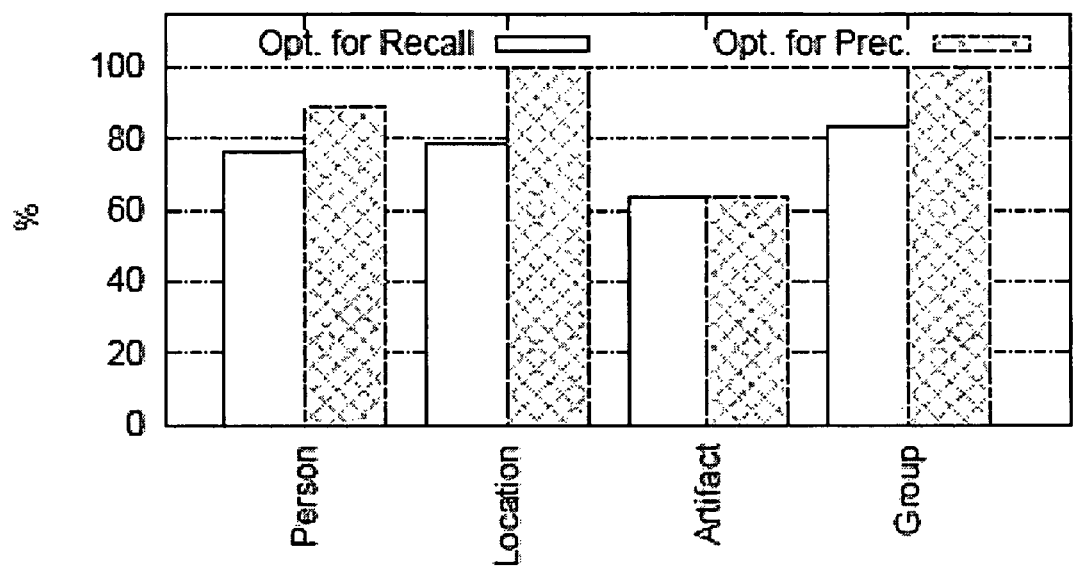

The top four most commonly occurring categories in the evaluation set were (in order): Person, Location, Artifact, and Group. The graph of FIG. 8 shows the precision achieved for each category when the system was optimized for either precision or recall. When optimized for recall there was a less than 8% variation between the Person, Location, and Group categories. Artifact was noticeably worse than the other three categories (over 12% lower than the second lowest) with a precision of 63.3%. This difference was even more pronounced when the system was optimized for precision. Where the precision of the Person, Location, and Group categories significantly increased to between 89% and 100%, the precision of the Artifact category barely changed.

When the system was optimized for precision, a precision of 100% was reached for both Location and Group, showing that particularly distinguishing structural patterns existed for these categories (the particularly high per category precision was partially due to the small size of the classified set). The low precision for the Artifact category was largely attributed to the huge variation in the types of artifacts in Wikipedia. WordNet defines an artifact as "nouns denoting man-made objects." To illustrate the inclusiveness of this definition, this ranges from a paper clip to the Empire State Building.

When the system was optimized for recall within an allowable precision, 39% of articles in Wikipedia were classified with a precision of 72%. The system is flexible enough that we can also optimize for higher levels of precision, i.e., 21% of articles were classified with a precision of 85%, and a precision of 100% for Locations and Groups. In our evaluation both configurations out performed DBpedia in all our performance measures.

Embodiments of the present invention may be employed to classify content resources in any of a wide variety of computing contexts. For example, as illustrated in the network diagram of FIG. 9, implementations are contemplated in which a population of contributors to Wikipedia interacts with a diverse network environment via any type of computer (e.g., desktop, laptop, tablet, etc.) 902, media computing platforms 903 (e.g., cable and satellite set top boxes and digital video recorders), mobile computing devices (e.g., PDAs) 904, cell phones 906, or any other type of computing or communication platform. However, as noted above, Wikipedia is only one example of a set of content resources which may be classified according to the invention. Any set of content resources (represented by computing device and associated data store 901) having embedded or associated structural patterns may be classified in a manner enabled by the invention.

Figure 9:
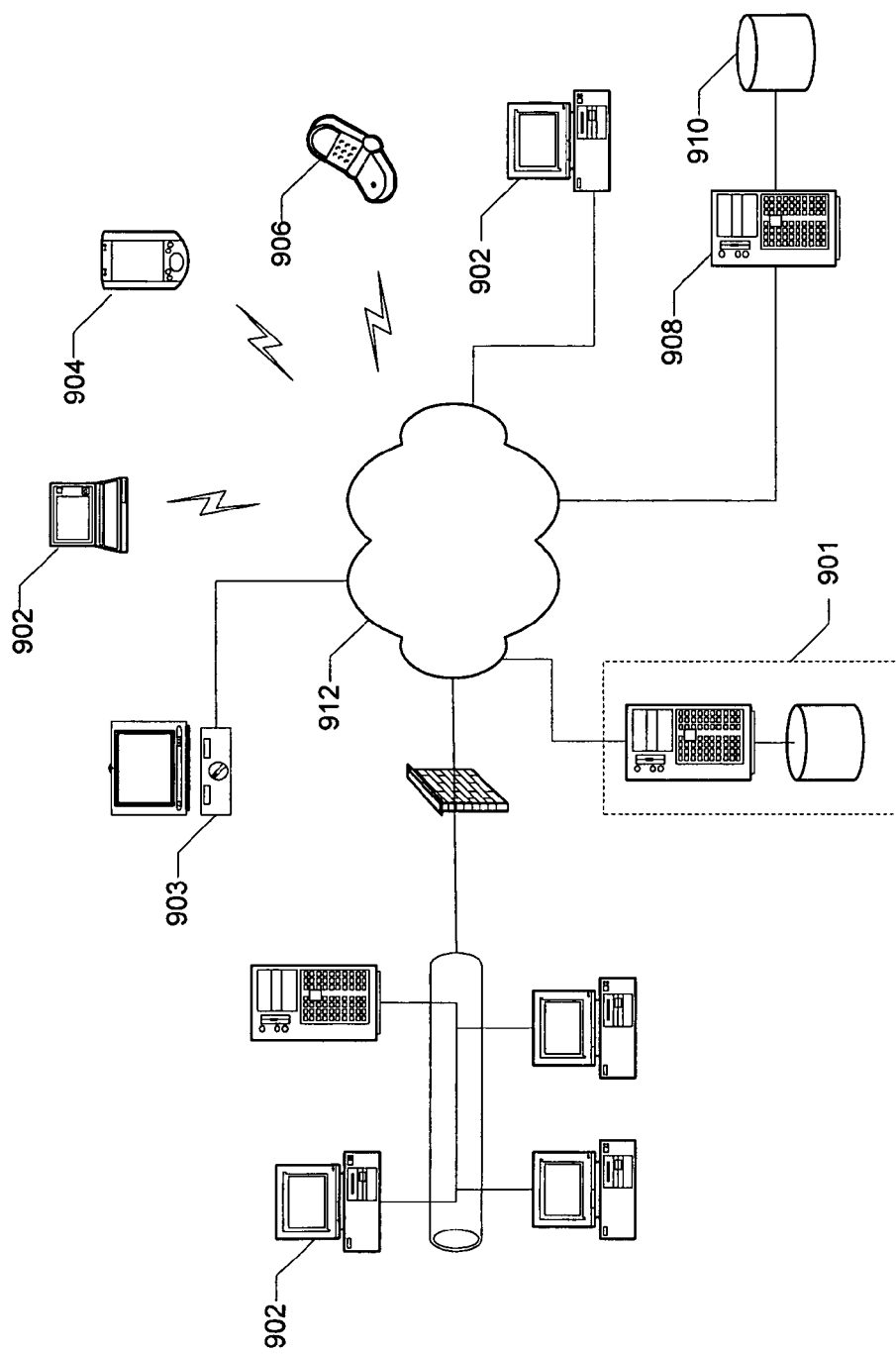
FIG. 9 is a simplified block diagram of a computing environment in which embodiments of the invention may be implemented.

Regardless of how the content resources are collected, they may be processed and/or classified in some centralized manner. This is represented in FIG. 9 by server 908 and data store 910 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 912.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention have been described herein with reference to the classification of so-called open content resources, i.e., content resources for which editorial control is decentralized, e.g., Wikipedia, DMOZ Open Directory, Yahoo! Directory, etc. However, it will be understood that the present invention is not limited to open content resources. Rather, any set of content resources which may be characterized by structured patterns of features may be classified in accordance with the invention. Similarly, the present invention should not be limited by the references to particular external classification schema (e.g., WordNet), or machine learning algorithms (e.g., SVMs) mentioned herein. Those of skill in the art will appreciate the wide variety of classification schema and algorithms which may be employed to implement the invention.

In addition, classification techniques enabled by the present invention may be used in a wide variety of contexts to enable or enhance a wide range of services and capabilities. One context is that of search technology and related services. The techniques enabled by the present invention may be applied to enhance the navigation of the original content resources or generate a schema that can be applied to alternate resources.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for classifying a set of content resources, the set of content resources being characterized by structured patterns among features associated with the content resources, wherein the features are metadata associated with each content resource, and wherein the structured patterns represent a multidimensional space and each of the content resources corresponds to a vector in the multidimensional space, the vector being populated by the features of the corresponding content resource, the method comprising:

enriching the vector of features associated with each of selected ones of the content resources with reference to the structured patterns by traversing a hierarchy of the structured patterns to identify at least one additional feature not originally included in the vector of features for inclusion in the vector of features thereby reducing data sparsity of the multidimensional space; and classifying each of the content resources with reference to the associated vector of features and a predefined classification schema not associated with the set of content resources.

2. The method of claim 1 wherein the structured patterns form a hierarchy of features, and wherein enriching the set of features associated with each of the selected content resources comprises traversing one or more levels of the hierarchy for each of the selected content resources to identify at least one additional feature for inclusion in the set of features.

3. The method of claim 2 further comprising setting a number of the levels of the hierarchy which may be traversed to effect enriching of the set of features associated with each of the selected content resources.

4. The method of claim 1 further comprising identifying a subset of the content resources as a training data set with reference to the associated features and the predefined classification schema, and training a machine learning algorithm using the training data set, wherein a remainder portion of the set of content resources are classified with the trained machine learning algorithm.

5. The method of claim 1 wherein classifying each of the content resources comprises representing each of the content resources as a multi-dimensional vector comprising scalar values representing the associated set of features, wherein selected ones of the scalar values are determined with reference to a weighting function, the weighting function representing one or more of (1) a first number representing instances of a corresponding feature for the content resource, (2) the first number combined with a second number representing instances of the corresponding feature in the set of content resources, or (3) the first number combined with a third number representing paths in a hierarchy of the structured patterns between the corresponding feature and the content resource.

6. The method of claim 1 wherein the set of content resources comprises open content resources for which editorial control is decentralized.

7. The method of claim 6 wherein the set of open content resources corresponds to one or more of Wikipedia, DMOZ Open Directory, or Yahoo! directory.

8. The method of claim 1 wherein the predefined classification schema comprises WordNet syntactic categories.

9. The method of claim 1 wherein the classifying each of the content resources comprises generating an output value for each of a plurality of classes for each content resource, the output value associated with each class representing a confidence level that the corresponding content resource belongs to the associated class, the method further comprising setting at least one threshold value for comparison with the output values, wherein output values above the threshold value are designated as positively classified and output values below the threshold value are designated as unclassified, the threshold value being tunable to strike a balance between precision and recall.

10. The method of claim 9 wherein the at least one threshold value comprises a separate threshold for each of the classes.

11. A system for classifying a set of content resources, the set of content resources being characterized by structured patterns among features associated with the content resources, wherein the features are metadata associated with each content resource, and wherein the structured patterns represent a multidimensional space and each of the content resources corresponds to a vector in the multidimensional space, the vector being populated by the features of the corresponding content resource, the system comprising at least one computing device configured to:
enrich the vector of features associated with each of selected ones of the content resources with reference to the structured patterns by traversing a hierarchy of the structured patterns to identify at least one additional feature not originally included in the vector of features for inclusion in the vector of features thereby reducing data sparsity of the multidimensional space; and
classify each of the content resources with reference to the associated vector of features and a predefined classification schema not associated with the set of content resources.

12. A computer program product for classifying a set of content resources, the set of content resources being characterized by structured patterns among features associated with the content resources, wherein the features are metadata associated with each content resource, and wherein the structured patterns represent a multidimensional space and each of the content resources corresponds to a vector in the multidimensional space, the vector being populated by the features of the corresponding content resource, the computer program product comprising at least one computer-readable medium having computer program instructions stored therein configured to enable at least one computing device to:
enrich the vector of features associated with each of selected ones of the content resources with reference to the structured patterns by traversing a hierarchy of the structured patterns to identify at least one additional feature not originally included in the vector of features for inclusion in the vector of features thereby reducing data sparsity of the multidimensional space; and
classify each of the content resources with reference to the associated vector of features and a predefined classification schema not associated with the set of content resources.

13. The computer program product of claim 12 wherein the structured patterns form a hierarchy of features, and wherein the computer program instructions are configured to enable the at least one computing device to enrich the set of features associated with each of the selected content resources by traversing one or more levels of the hierarchy for each of the selected content resources to identify at least one additional feature for inclusion in the set of features.

14. The computer program product of claim 13 wherein the computer program instructions are further configured to enable the at least one computing device to set a number of the levels of the hierarchy which may be traversed to effect enriching of the set of features associated with each of the selected content resources.

15. The computer program product of claim 12 wherein the computer program instructions are further configured to enable the at least one computing device to identify a subset of the content resources as a training data set with reference to the associated features and the predefined classification schema, and train a machine learning algorithm using the training data set, wherein a remainder portion of the set of content resources are classified with the trained machine learning algorithm.

16. The computer program product of claim 12 wherein the computer program instructions are configured to enable the at least one computing device to classify each of the content resources by representing each of the content resources as a multi-dimensional vector comprising scalar values representing the associated set of features, wherein selected ones of the scalar values are determined with reference to a weighting function, the weighting function representing one or more of (1) a first number representing instances of a corresponding feature for the content resource, (2) the first number combined with a second number representing instances of the corresponding feature in the set of content resources, or (3) the first number combined with a third number representing paths in a hierarchy of the structured patterns between the corresponding feature and the content resource.

17. The computer program product of claim 12 wherein the set of content resources comprises open content resources for which editorial control is decentralized.

18. The computer program product of claim 17 wherein the set of open content resources corresponds to one or more of Wikipedia, DMOZ Open Directory, or Yahoo! directory.

19. The computer program product of claim 12 wherein the predefined classification schema comprises WordNet syntactic categories.

20. The computer program product of claim 12 wherein the computer program instructions are configured to enable the at least one computing device to classify each of the content resources by generating an output value for each of a plurality of classes for each content resource, the output value associated with each class representing a confidence level that the corresponding content resource belongs to the associated class, the computer program instructions being further configured to enable the at least one computing device to set at least one threshold value for comparison with the output values, wherein output values above the threshold value are designated as positively classified and output values below the threshold value are designated as unclassified, the threshold value being tunable to strike a balance between precision and recall.

21. The computer program product of claim 20 wherein the at least one threshold value comprises a separate threshold for each of the classes.

* * * * *